(12) United States Patent
Makulec et al.

(10) Patent No.: US 9,353,690 B2
(45) Date of Patent: May 31, 2016

(54) INTERFACE WITH MOUNT FEATURES FOR PRECISE ALIGNMENT

(75) Inventors: Jeffrey M. Makulec, Rockford, IL (US); Jeffrey A. Stadler, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1640 days.

(21) Appl. No.: 12/820,085

(22) Filed: Jun. 21, 2010

(65) Prior Publication Data
US 2011/0308345 A1  Dec. 22, 2011

(51) Int. Cl.
*F01D 5/02* (2006.01)
*F16C 3/02* (2006.01)
*F16D 1/072* (2006.01)
*F16D 1/10* (2006.01)
*F02C 7/277* (2006.01)
*F02C 7/32* (2006.01)
*F02C 7/36* (2006.01)

(52) U.S. Cl.
CPC ............... *F02C 7/277* (2013.01); *F01D 5/026* (2013.01); *F02C 7/32* (2013.01); *F02C 7/36* (2013.01); *F16C 3/02* (2013.01); *F16D 1/101* (2013.01); *F16D 2001/103* (2013.01); *Y10T 74/19888* (2015.01); *Y10T 74/19893* (2015.01); *Y10T 403/63* (2015.01); *Y10T 403/7026* (2015.01)

(58) Field of Classification Search
CPC .............. F01D 5/026; F02C 7/32; F02C 7/36; F16C 3/02; F16C 2226/12; F16C 2226/80; F16D 1/072; F16D 1/101; F16D 2001/103
USPC ............. 403/19, 287, 333, 345, 359.1–359.6; 74/438
See application file for complete search history.

(56) References Cited

U.S. PATENT DOCUMENTS

| | | | |
|---|---|---|---|
| 4,702,273 A | 10/1987 | Allen, Jr. et al. | |
| 4,871,296 A | 10/1989 | Laessle et al. | |
| 4,885,909 A | 12/1989 | Rodgers | |
| 4,899,534 A | 2/1990 | Sorenso | |
| 4,916,893 A | 4/1990 | Rodgers | |
| 4,926,631 A | 5/1990 | Sorenson | |
| 5,042,963 A | 8/1991 | Sorenson et al. | |
| 5,054,284 A | 10/1991 | Shekleton | |
| 5,127,220 A | 7/1992 | Jesrai et al. | |
| 5,160,005 A | 11/1992 | Burch | |
| 5,245,820 A | 9/1993 | Zalewski et al. | |
| 6,305,156 B1 | 10/2001 | Lui | |
| 6,318,958 B1 | 11/2001 | Giesler et al. | |
| 6,585,483 B2 | 7/2003 | Feest | |
| 6,623,238 B2 | 9/2003 | Langston et al. | |
| 6,681,579 B2 | 1/2004 | Lane et al. | |
| 6,684,898 B2 | 2/2004 | Wiggins et al. | |
| 6,694,746 B2 | 2/2004 | Reed et al. | |
| 6,892,455 B1 | 5/2005 | Feest | |
| 6,969,236 B2 | 11/2005 | Giesler et al. | |
| 6,991,425 B2 | 1/2006 | Kruegel et al. | |
| 7,033,133 B2 | 4/2006 | Bristol et al. | |
| 7,033,134 B2 | 4/2006 | Bristol et al. | |
| 7,186,081 B2 | 3/2007 | Giesler et al. | |
| 7,296,970 B2 | 11/2007 | Bannon et al. | |
| 7,306,430 B2 | 12/2007 | Russ | |

(Continued)

*Primary Examiner* — Josh Skroupa

(74) *Attorney, Agent, or Firm* — Carlson, Gaskey & Olds, P.C.

(57) ABSTRACT

A connection for a rotating machine according to an exemplary aspect of the present disclosure includes an interface axially between and adjacent to a first interference fit and a second interference fit.

18 Claims, 5 Drawing Sheets

(56) References Cited

U.S. PATENT DOCUMENTS

| | | | |
|---|---|---|---|
| 7,387,462 B2 * | 6/2008 | Hacker | 403/359.6 |
| 7,410,344 B2 | 8/2008 | Seidel et al. | |
| 7,419,357 B2 | 9/2008 | Nohr et al. | |
| 2008/0069636 A1 * | 3/2008 | Saito et al. | 403/359.1 |
| 2009/0050088 A1 * | 2/2009 | Schafer et al. | 123/90.17 |
| 2009/0245935 A1 * | 10/2009 | Kamikawa et al. | 403/359.1 |
| 2010/0003075 A1 * | 1/2010 | Lang et al. | 403/343 |

* cited by examiner

INTERFACE WITH MOUNT FEATURES FOR PRECISE ALIGNMENT

BACKGROUND

The present disclosure relates to an air-turbine starter used to start gas turbine engines, and more particularly to a shaft connection therefor.

Many relatively large turbine engines, including turbofan engines, may use an air turbine starter (ATS) to initiate turbine engine rotation. The ATS includes a turbine section coupled to an output section mounted within a housing. The turbine section is coupled to a high pressure fluid source, such as compressed air, to drive the output section. The turbine section drives the output section through a gear system. Thus, when the high pressure fluid source impinges upon the turbine section, the output section powers the turbine engine.

SUMMARY

A connection a rotating machine according to an exemplary aspect of the present disclosure includes an interface axially between and adjacent to a first interference fit and a second interference fit.

A gear according to an exemplary aspect of the present disclosure includes a spline pitch inner diameter axially between and adjacent to a gear inboard pilot diameter and a gear outboard pilot diameter.

A turbine rotor shaft according to an exemplary aspect of the present disclosure includes a spline pitch outer diameter axially between and adjacent to a turbine rotor shaft inboard pilot diameter and a turbine rotor shaft outboard pilot diameter.

An air turbine starter according to an exemplary aspect of the present disclosure includes a gear mounted to a turbine rotor shaft, the turbine rotor and the gear defines a connection having an interface axially between and adjacent to said interference fit and a second interference fit.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
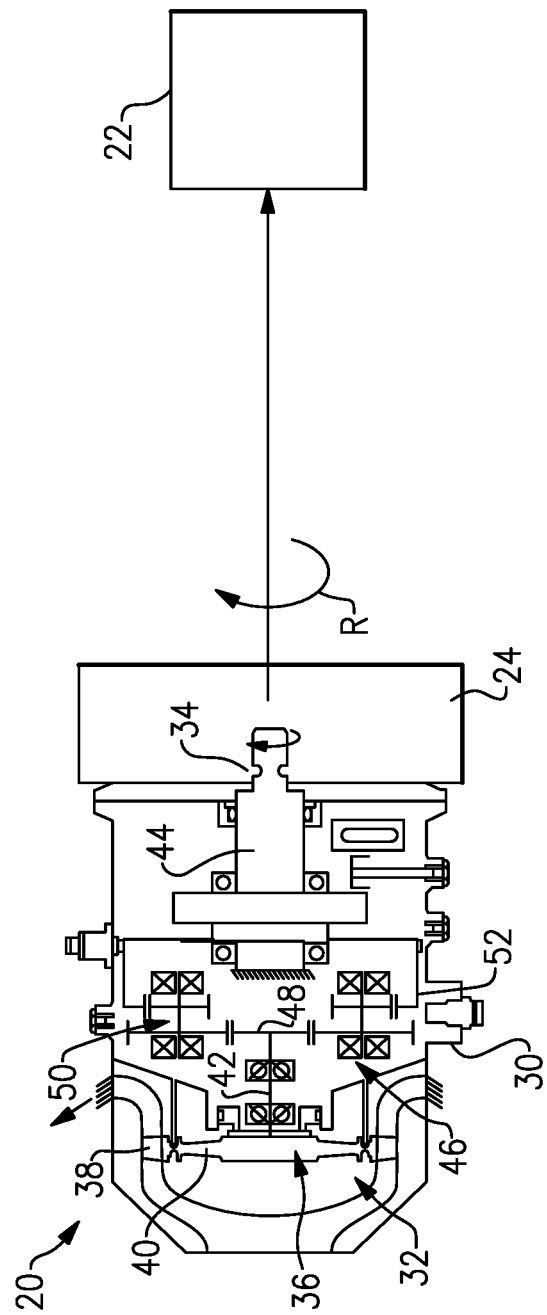
FIG. 1 is a general schematic view of an air turbine starter (ATS) used to initiate the rotation of a larger turbine through an accessory gearbox.
Figure 2:
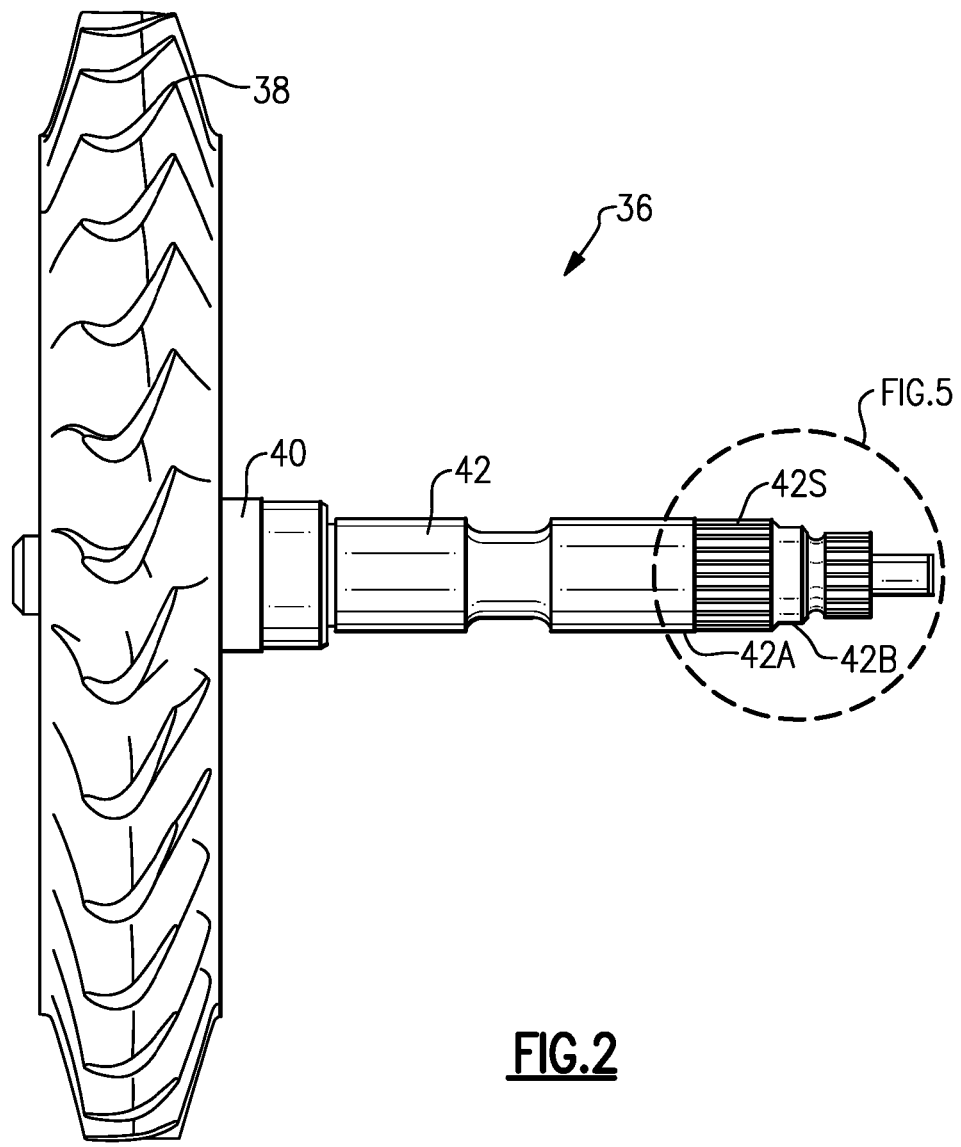
FIG. 2 is a side perspective view of a turbine rotor shaft.

FIG. 1 schematically illustrates an exemplary air turbine starter(ATS) 20 that is used to initiate the rotation, represented at "R," of a larger turbine 22, such as a turbofan engine through an accessory gearbox 24. The ATS 20 generally includes a housing assembly 30 that includes at least a turbine section 32 and an output section 34. The turbine section 32 includes a turbine wheel 36 with a plurality of blades 38, a hub 40, and a turbine rotor shaft 42 (FIG. 2). The turbine rotor shaft 42 is coupled to a starter output shaft 44 though a gear system 46 (illustrated schematically) such as a planetary gear system. It should be appreciated that the present application is not limited to use in conjunction with a specific type of rotating machine. Thus, although the present application is, for convenience of explanation, depicted and described as being implemented in an air turbine starter, it should be appreciated that it can be implemented in numerous other machines including, but not limited to, a gas turbine engine, an auxiliary power unit, a turbo charger, a super charger, an air cycle machine, an alternator, an electric motor, an electric generator, an integrated constant speed drive generator and gearboxes of various types with an interface which is to be closely controlled.

The ATS 20 transmits relatively high loads through the gear system 46 to convert pneumatic energy into mechanical energy for turbine engine starting. The planetary gear system 46 generally includes a sun gear 48 mounted to the turbine rotor shaft 42 to drives a planet gear set 50 (illustrated schematically) which, in turn, drive a single ring gear 52 (illustrated schematically) connected to the starter output shaft 44. To minimize ATS size and weight, precise alignment of the planetary gear system 46 facilitates the smallest, lightest weight gears capable of desired life requirements. The sun gear 48 on the turbine rotor shaft 42 should thereby be precisely aligned due to the high transmitted load.

Figure 3:
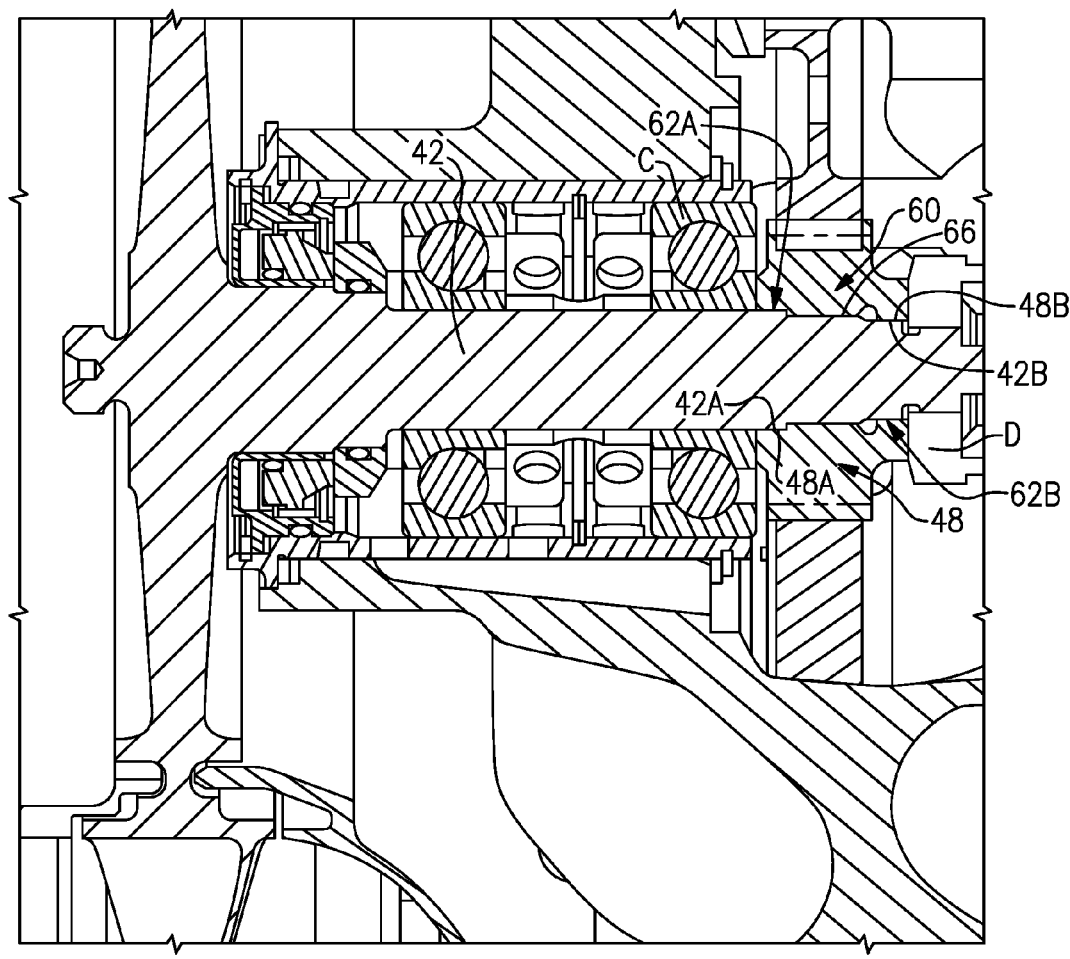
FIG. 3 is an expanded view of an interface for the ATS.

With reference to FIG. 3, a connection 60 is utilized to mechanically mount the sun gear 48 upon the turbine rotor shaft 42. In the disclosed non-limiting embodiment, the connection 60 includes an interference fit 62A, 62B and an interface 66 such as a splined interface to transfer torque; however, other connections such as single square keys, multiple square keys, or Woodruff keys may alternatively or additionally be utilized. The splined interface distributes the transmitted torque around the circumference of the turbine rotor shaft 42 rather than concentrating at the locations of keys. To maintain a precise alignment of the sun gear 48 on the turbine rotor shaft 42, the sun gear 48 and the turbine rotor shaft 42 are configured to provide the interference fit 62A, 62B at each end section 48A, 48B of the sun gear 48 to flank a conventional interface 66.

The interference fit 62A, 62B may be defined to provide an interference for all operating conditions yet minimizes the magnitude of interference which must be overcome during assembly of the ATS 20. The interface 66 may be defined by a spline 42S (FIGS. 2 and 5) on the turbine rotor shaft 42 and a spline 48S of the sun gear 48 (FIG. 4) to provide the interface 66 which, as typical, may have some backlash.

Figure 5:
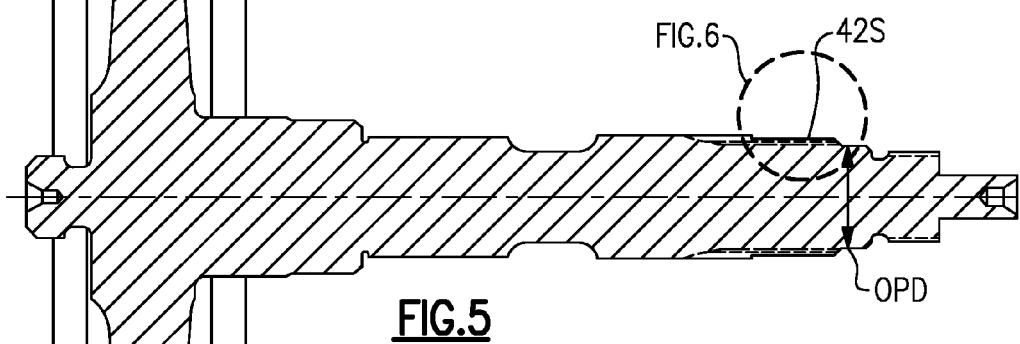
FIG. 5 is an expanded side sectional view of the turbine rotor shaft.

In one non-limiting embodiment, the interference fits 62A, 62B are respectively defined by an inboard pilot diameter 42A and an outboard pilot diameter 42B. The inboard pilot diameter 42A is larger in diameter than the major diameter of the spline 42S on the turbine rotor shaft 42 while the outboard pilot diameter 42B is smaller than the minor diameter of the spline 42S (FIG. 5). That is, the inboard pilot diameter 42A is larger in diameter than the major diameter of the spline 42S on the turbine rotor shaft 42 while the outboard pilot diameter 42B is smaller than the minor diameter of the spline 42S to facilitate a unidirectional assembly (rotor shaft 42 inserted from left to right in the Figure). It should be understood that other relationships may alternatively be provided. The outboard pilot diameter 42B may alternatively be only slightly smaller than the rotor shaft spline major diameter (diameter of the tips of the teeth) which may result in "remnant" spline teeth across all or a portion width of the outboard pilot diameter 42B; however, this would be acceptable for operational usage.

Figure 4:
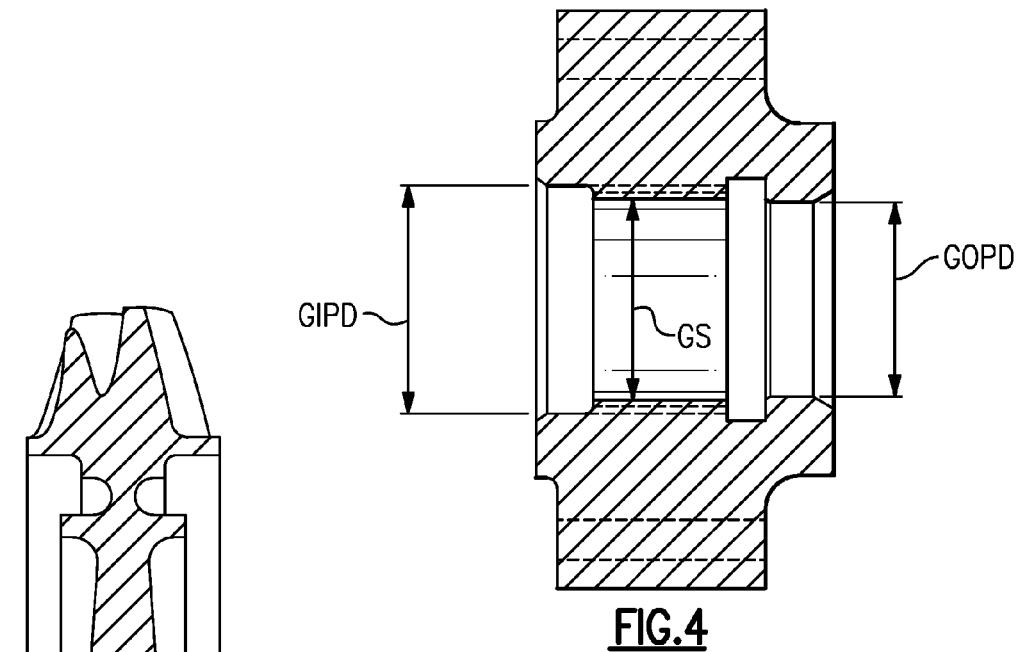
FIG. 4 is a side sectional view of a sun gear mountable to the turbine rotor shaft.
Figure 6:
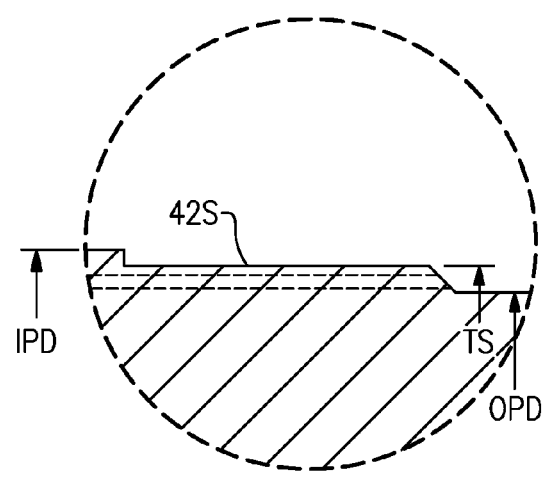
FIG. 6 is an expanded view of a spline of the turbine rotor shaft.

The inboard interference fit 62A is defined by a turbine rotor shaft dimension IPD (FIG. 6) and a gear inboard pilot diameter dimension GIPD (FIG. 4). The outboard interference fit 62B is defined by a turbine rotor shaft dimension OPD and a gear outboard pilot diameter dimension GOPD (FIG. 4). The turbine rotor shaft 42 also defines a spline major diameter dimension TS. In one non-limiting dimension embodiment, IPD is approximately 0.59 inches (14.99 mm); OPD is approximately 0.50 inches (12.7 mm); and TS is 0.575 inches (14.6 mm).

The gear inboard pilot diameter dimension GIPD, the gear outboard pilot diameter dimension GOPD, and a spline minor diameter of the gear spline are defined by dimension GS. In one non-limiting dimension embodiment, GIPD is approximately 0.59 inches (14.99 mm); GOPD is approximately 0.50 inches (12.7 mm) and GS is approximately 0.525 inches (13.3 mm).

Figure 7:
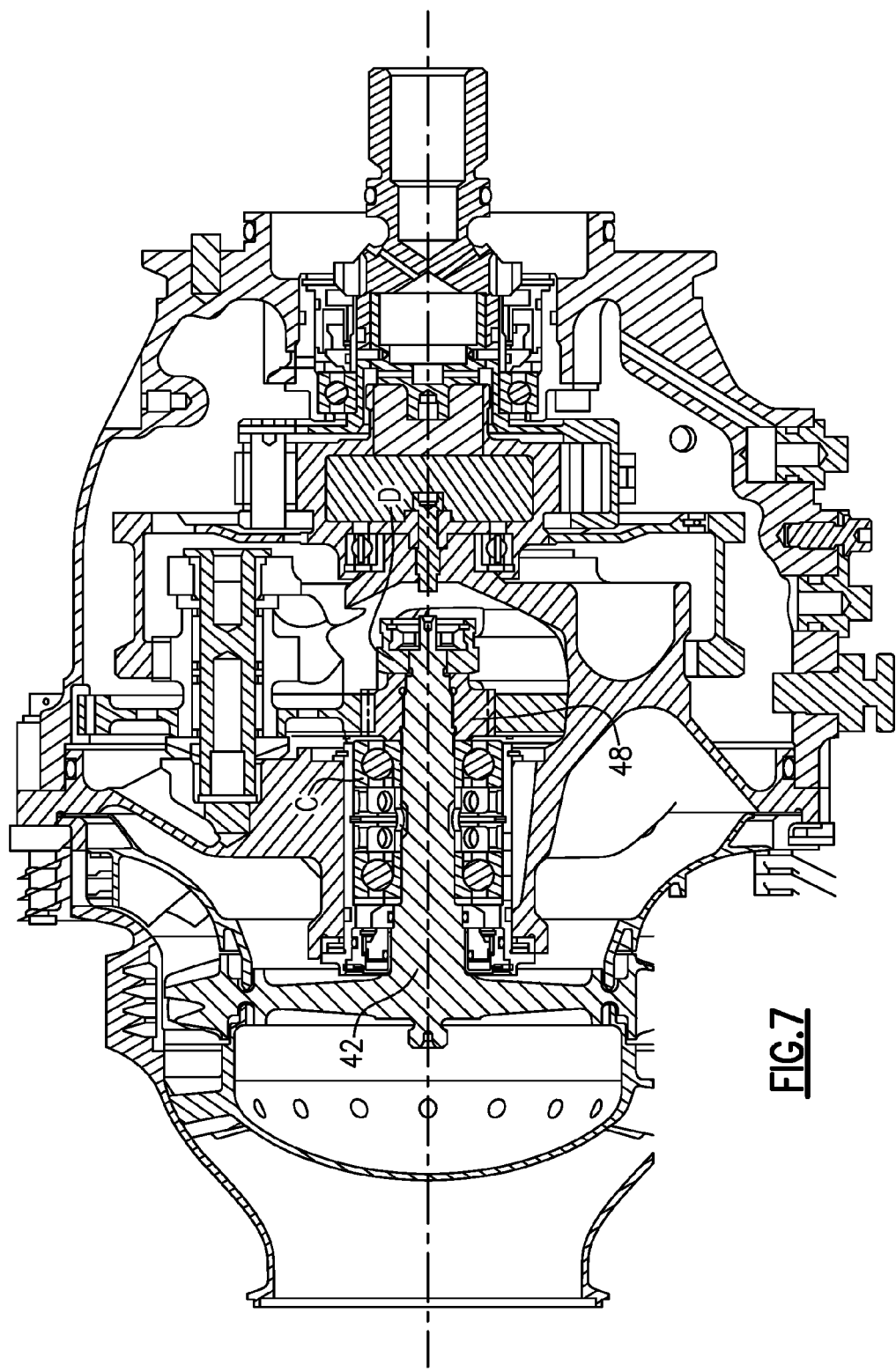
FIG. 7 is a perspective sectional view of a spline of the turbine rotor shaft.

The closely controlled radial location relationship between the pilot diameters with respect to each other, and also to the pitch diameter of the sun gear 48, ensures proper location and alignment. That is, the double interference pilot fit ensures the sun gear 48 does not tilt when an end face of the sun gear 48 seats against an end face of an adjacent component C mounted to the turbine rotor shaft 42 (FIG. 7). It should be appreciated that the component C is representative of various components which may be mounted to the turbine rotor shaft 42. An arrangement which does not use two interference pilots achieves a potentially less effective alignment because the gear may be subject to tilting when clamped in place by a component D such as a nut opposite the component C (FIG. 7). This may result in adverse gear life.

It should also be appreciated that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An air turbine starter comprising:
   a turbine including a turbine wheel with a plurality of turbine blades and a turbine rotor shaft coaxial with said turbine wheel;
   a gear mounted to said turbine rotor shaft, said turbine rotor shaft and said gear define a connection comprising:
      a first interference fit;
      a second interference fit; and
      an interface axially between and adjacent to said first interference fit and said second interference fit, wherein in said interface said turbine rotor shaft engages and rotationally locks with said gear such that through said interface said rotor shaft is operable to transfer torque to said gear.

2. The air turbine starter as recited in claim 1, wherein a pilot diameter of said first interference fit is larger in diameter than a pilot diameter of said second interference fit.

3. The air turbine starter as recited in claim 1, wherein a pilot diameter of said first interference fit is larger in diameter than a major diameter of said interface of said turbine rotor shaft and a pilot diameter of said second interference fit is smaller than said major diameter of said interface.

4. The air turbine starter as recited in claim 1, further comprising a component mounted to said turbine rotor shaft to abut said gear and a nut mounted to said turbine rotor shaft to abut said gear, said nut operable to axially drive said gear toward said component.

5. The air turbine starter as recited in claim 1, wherein said gear includes:
   a gear inboard pilot diameter;
   a gear outboard pilot diameter;
   a spline minor diameter axially between and adjacent to said gear inboard pilot diameter and said gear outboard pilot diameter.

6. The air turbine starter as recited in claim 5, wherein said gear inboard pilot diameter is greater than said gear outboard pilot diameter.

7. The air turbine starter as recited in claim 5, wherein said gear outboard pilot diameter and said gear inboard pilot diameter each define an inner diameter.

8. The air turbine starter as recited in claim 5, wherein said turbine rotor shaft includes:
   a turbine rotor shaft inboard pilot diameter;
   a turbine rotor shaft outboard pilot diameter;
   a spline major diameter axially between and adjacent to said turbine rotor shaft inboard pilot diameter and turbine rotor shaft outboard pilot diameter.

9. The air turbine starter as recited in claim 8, wherein said turbine rotor shaft inboard pilot diameter is greater than said turbine rotor shaft outboard pilot diameter.

10. The air turbine starter as recited in claim 9, wherein said turbine rotor shaft inboard pilot diameter and said turbine rotor shaft outboard pilot diameter each define an outer diameter.

11. The air turbine starter as recited in claim 1, wherein said gear is a sun gear of a planetary gear system.

12. The air turbine starter as recited in claim 1, wherein said first interference fit is an interference between a gear inboard pilot diameter of said gear and a turbine rotor shaft inboard pilot diameter of said turbine rotor shaft, and said second interference fit is an interference between a gear outboard pilot diameter of said gear and a turbine rotor shaft outboard pilot diameter of said turbine rotor shaft, said gear inboard pilot diameter is greater than said gear outboard pilot diameter, and said turbine rotor shaft inboard pilot diameter is greater than said turbine rotor shaft outboard pilot diameter.

13. The air turbine starter as recited in claim 12, wherein said interface is a splined interface.

14. The air turbine starter as recited in claim 1, wherein said first interference fit and said second interference fit bound, respectively, opposed axial ends of said interface.

15. The air turbine starter as recited in claim 1, wherein said interface is a spline.

16. The air turbine starter as recited in claim 1, wherein said first interference fit and said second interference fit are each non-splined.

17. The air turbine starter as recited in claim 1, wherein said gear is a sun gear in a planetary gear system.

18. The air turbine starter as recited in claim 17, further comprising a starter output shaft, and said rotor shaft operable to rotate said starter output shaft through said planetary gear system.

* * * * *